(12) United States Patent
Jiao et al.

(10) Patent No.: US 12,670,898 B1
(45) Date of Patent: Jun. 30, 2026

(54) TRAINING AND TESTING MACHINE LEARNING MODELS USING BIASED SAMPLES

(71) Applicant: Amazon Technologies, Inc., Seattle, WA (US)

(72) Inventors: Yunlong Jiao, Hatfield (GB); Anisha Garg, Seattle, WA (US); Emine Yilmaz, London (GB); Gabriella Kazai, Bishops Stortford (GB); Liu Yang, Seattle, WA (US); Wenbo Yan, Redmond, WA (US); Liane Lewin-Eytan, Binyamina (IL); Prathap Ramachandra, Kirkland, WA (US); Prasanna Soundararajan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 18/473,712

(22) Filed: Sep. 25, 2023

(51) Int. Cl.
*G10L 15/06* (2013.01)
*G10L 15/26* (2006.01)

(52) U.S. Cl.
CPC ............ *G10L 15/063* (2013.01); *G10L 15/26* (2013.01); *G10L 2015/0638* (2013.01)

(58) Field of Classification Search
CPC .................. G10L 15/063; G10L 15/26; G10L 2015/0638
See application file for complete search history.

(56) References Cited

U.S. PATENT DOCUMENTS

| | | | | |
|---|---|---|---|---|
| 11,195,522 B1* | 12/2021 | Makashir | ............ | G10L 15/1815 |
| 2014/0223284 A1* | 8/2014 | Rankin, Jr. | ........... | G06F 40/169 |
| | | | | 715/234 |
| 2016/0006744 A1* | 1/2016 | Du | .......................... | H04L 67/12 |
| | | | | 726/4 |
| 2016/0162569 A1* | 6/2016 | Erle | ...................... | G06F 40/169 |
| | | | | 707/739 |
| 2018/0293908 A1* | 10/2018 | Wang | ........................ | G09B 5/02 |
| 2022/0013023 A1* | 1/2022 | Hellman | ................. | G06F 40/20 |
| 2022/0050955 A1* | 2/2022 | Awadalla | ............. | G06N 3/0499 |

(Continued)

OTHER PUBLICATIONS

Alam et al., "Domain Adaptation with Adversarial Training and Graph Embeddings", May 14, 2018, 11 pages.

(Continued)

*Primary Examiner* — Michael Colucci
(74) *Attorney, Agent, or Firm* — Nicholson De Vos Webster & Elliott LLP

(57) ABSTRACT

Techniques for training and testing machine learning models using biased samples are described. In some examples, a sampled test set is generated by estimating a propensity score for each annotation of the set of annotations, wherein a propensity score quantifies a likelihood of being human generated using the set of data, estimating a confidence score for each annotation of the set of annotations, wherein a confidence score quantifies a confidence in a correctness of the annotation, mapping each annotation of the set of annotations to a multi-dimensional space based at least in part on the propensity score, stratifying, based on the (Continued)

propensity score, the mapped annotations, and sampling each stratum according to a request to generate a sampled test set.

20 Claims, 10 Drawing Sheets

(56)                          References Cited

U.S. PATENT DOCUMENTS

| | | | |
|---|---|---|---|
| 2023/0067976 A1* | 3/2023 | Bhusan | G06F 40/284 |
| 2023/0110027 A1* | 4/2023 | Bajpayee | B60W 30/09 701/301 |
| 2024/0062745 A1* | 2/2024 | Smyth | G10L 15/063 |
| 2024/0070516 A1* | 2/2024 | Patel | G06N 3/08 |
| 2024/0126822 A1* | 4/2024 | Hamilton | G06F 16/9538 |

OTHER PUBLICATIONS

Aslam et al., "A Practical Sampling Strategy for Efficient Retrieval Evaluation", 2007, pp. 1-10.
Autenrieth et al., "A general-purpose statistical method for improved learning under Covariate Shift", Oct. 20, 2021, 13 pages.
Bianca Zadrozny, "Learning and Evaluating Classifiers under Sample Selection Bias", Proceedings of the 21 st International Conference on Machine Learning, Banff, Canada, 2004, 8 pages.
Blitzer et al., "Domain Adaptation with Structural Correspondence Learning", Proceedings of the 2006 Conference on Empirical Methods in Natural Language Processing (EMNLP 2006), pp. 120-128.
Charles Elkan, "The Foundations of Cost-Sensitive Learning", Proceedings of the Seventeenth International Joint Conference on Artificial Intelligence (IJCAI'01), May 2001, 6 pages.
Devlin et al., "BERT: Pre-training of Deep Bidirectional Transformers for Language Understanding", May 24, 2019, 16 pages.
Efron et al., "An Introduction to the Bootstrap", 1994, 11 pages.
Ganin et al., "Domain-Adversarial Training of Neural Networks", Journal of Machine Learning Research 17 (2016), pp. 1-35.
Han et al., "Unsupervised Domain Adaptation of Contextualized Embeddings for Sequence Labeling", Sep. 5, 2019, 12 pages.
Horvitz et al., "A Generalization of Sampling Without Replacement From a Finite Universe", Journal of the American Statistical Association, vol. 47, No. 260 (Dec. 1952), pp. 663-685.
Mehrabi et al., "A Survey on Bias and Fairness in Machine Learning", Jan. 25, 2022, 34 pages.
Pan et al., "Transferrable Prototypical Networks for Unsupervised Domain Adaptation", 2019, pp. 2239-2247.
Rosenbaum et al., "The Central Role of the Propensity Score in Observational Studies for Causal Effects", vol. 70, No. 1. (Apr. 1983), pp. 41-55.
Timothy Miller et al., "Simplified Neural Unsupervised Domain Adaptation", May 22, 2019, 6 pages.
Vu et al., "Effective Unsupervised Domain Adaptation with Adversarially Trained Language Models", Oct. 5, 2020, 11 pages.

* cited by examiner

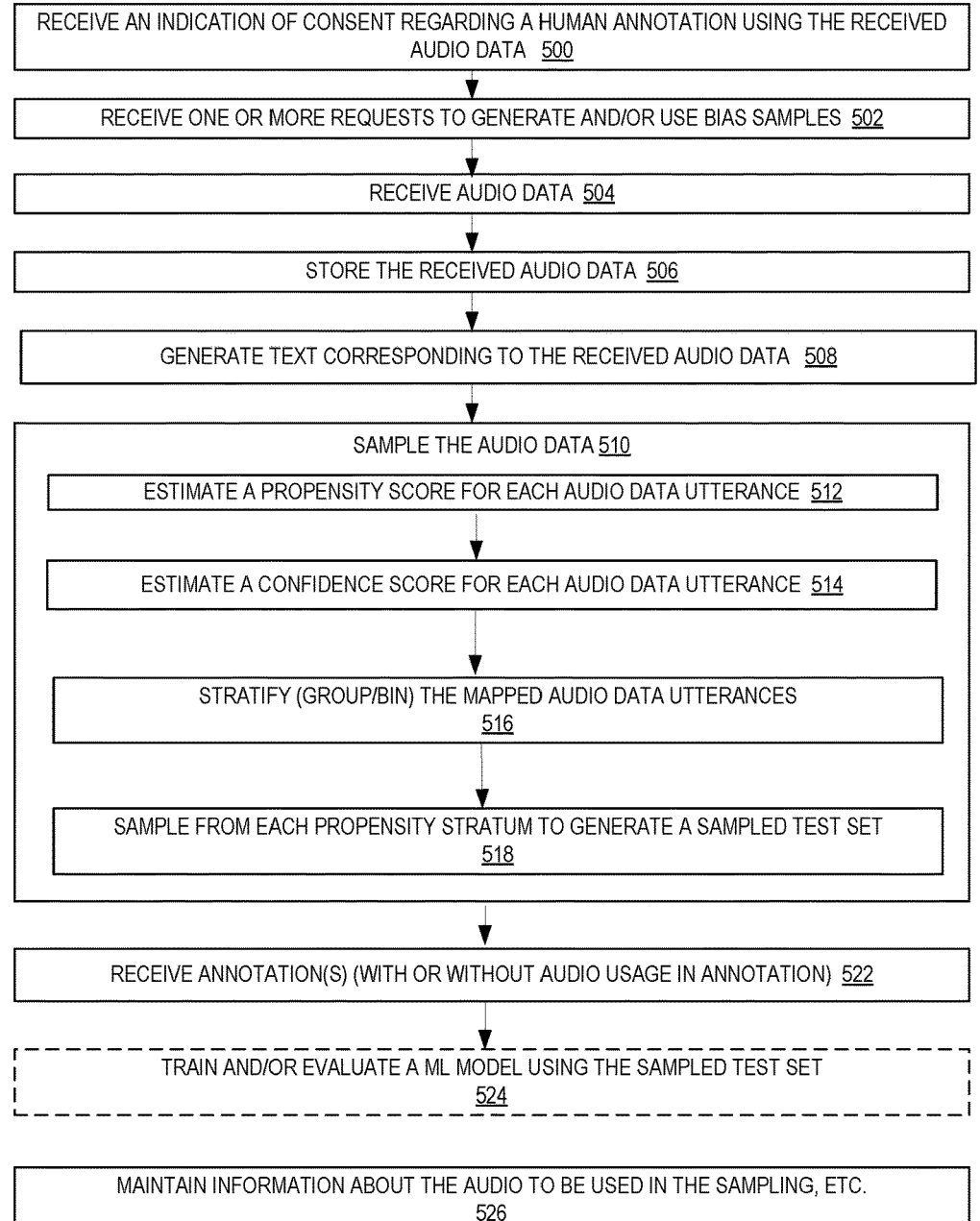

RECEIVE AN INDICATION OF CONSENT REGARDING A HUMAN ANNOTATION USING THE RECEIVED AUDIO DATA  500

RECEIVE ONE OR MORE REQUESTS TO GENERATE AND/OR USE BIAS SAMPLES  502

RECEIVE AUDIO DATA  504

STORE THE RECEIVED AUDIO DATA  506

GENERATE TEXT CORRESPONDING TO THE RECEIVED AUDIO DATA  508

SAMPLE THE AUDIO DATA 510

ESTIMATE A PROPENSITY SCORE FOR EACH AUDIO DATA UTTERANCE  512

ESTIMATE A CONFIDENCE SCORE FOR EACH AUDIO DATA UTTERANCE  514

STRATIFY (GROUP/BIN) THE MAPPED AUDIO DATA UTTERANCES
516

SAMPLE FROM EACH PROPENSITY STRATUM TO GENERATE A SAMPLED TEST SET
518

RECEIVE ANNOTATION(S) (WITH OR WITHOUT AUDIO USAGE IN ANNOTATION)  522

TRAIN AND/OR EVALUATE A ML MODEL USING THE SAMPLED TEST SET
524

MAINTAIN INFORMATION ABOUT THE AUDIO TO BE USED IN THE SAMPLING, ETC.
526

*FIG. 5*

| CONSENT FOR AUDIO ANNOTATION? | AUDIO IDENTIFIER | AUDIO LOCATION | ANNOTATION | TYPE OF ANNOTATION | TEXT | ANNOTATION PERFORMER | PROPENSITY SCORE | CONFIDENCE SCORE | PROPENSITY BIN | CONF. THRESHOLD |
|---|---|---|---|---|---|---|---|---|---|---|
| YES | 1 | URL:123ABC | LABEL | NUMERIC | AUDIO TEXT | WORKFLOW ID (DAY DONE, ETC.) | VALUE | VALUE | VALUE | VALUE |
| NO | 2 | URL:456DEF | LABEL | CATEGORIC | AUDIO TEXT | WORKFLOW ID (DAY DONE, ETC.) | VALUE | VALUE | VALUE | VALUE |
| | | | | | . . . | | | | | |
| YES | 100000 | URL:ZXY321 | LABEL | NAME | AUDIO TEXT | WORKFLOW ID (DAY DONE, ETC.) | VALUE | VALUE | VALUE | VALUE |

*FIG. 6*

TRAINING AND TESTING MACHINE LEARNING MODELS USING BIASED SAMPLES

BACKGROUND

Supervised machine learning (ML) models rely on ground truth data for model training and testing. Ground truth data (e.g., labels for a particular task) is typically collected on a sample of the population (e.g., a subset of individuals or data from the live traffic of an ML-based service). The ground truth data can be provided by human annotators or obtained via automated annotation methods such as programmatic weak labelling (e.g., labelling functions propagate rule-based labels derived from a small set of examples). During training, a model's weights are learned by minimizing a loss function that evaluates the model predictions against the ground truth data (e.g., through iterative backpropagation); during testing, model performance is measured against the ground truth.

BRIEF DESCRIPTION OF DRAWINGS

Various examples in accordance with the present disclosure will be described with reference to the drawings, in which:

FIG. 5 is a flow diagram illustrating operations of a method for annotation according to some examples.

FIG. 6 illustrates examples of information about input audio that may be used.

DETAILED DESCRIPTION

Figure 1:
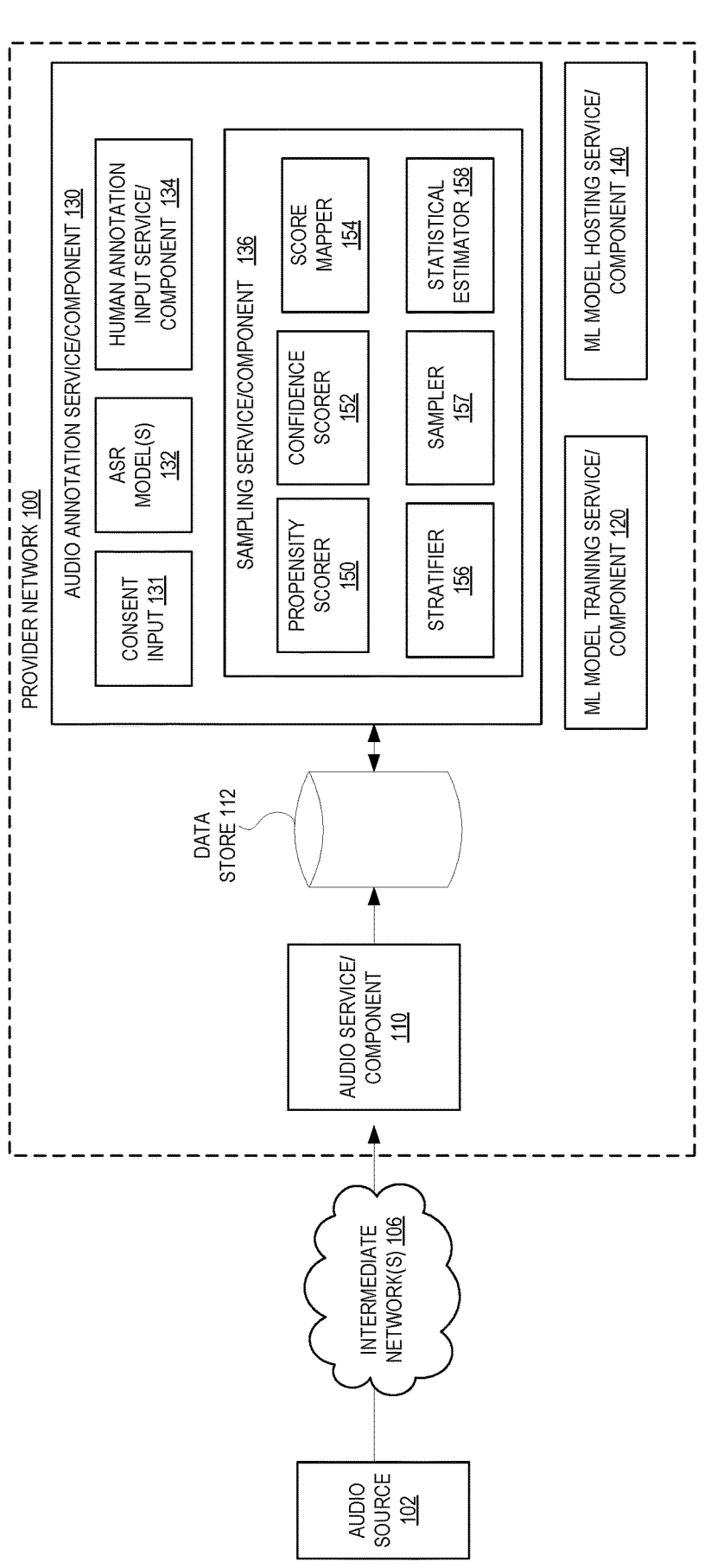
FIG. 1 illustrates examples of a system for performing training and/or testing a ML model.

The present disclosure relates to methods, apparatus, systems, and non-transitory computer-readable storage media for training and testing ML models using biased samples.

The success of annotation-based ML model development and evaluation may depend on multiple factors. For example, the sample of the population's representativeness of the population of interest and the quality of the ground truth data. Obtaining a sample that is representative of the entire population may be necessary when the entire population is too large (e.g., given some annotation budget) but there is a desire for the sample to reflect the entire population. A previous, and simple, sampling approach is to draw a random sample from the population. However, random sampling is not always an option when all individuals or data are not selectable. When sampling is not done randomly, a representation bias may be observed when there is a systematic error.

The quality of ground truth data can also be impacted by multiple factors. For example, ground truth data provided by human annotators can be impacted by source signal availability (e.g., genre, size, licensing, etc.), the annotator's background (e.g., expertise, training, etc.), the annotation scheme used (e.g., complexity, guidelines, etc.), annotation software used (e.g., graphical interface, etc.), etc. Any one of these factors may lead to annotation noise/bias with automated annotations even more prone to introducing noise/bias, for example when automated annotations are based on heuristics or programmatic rules or derived from another model.

Both representation bias and annotation noise/bias are ubiquitous. They may also be inter-dependent. For example, some vital signals that are necessary for an annotation task may not be missing at random and higher-quality annotations can be obtained on a representation-biased sample than the rest due to the availability of such signals.

Many services powered by ML-based models currently require human annotations for model training and testing. However, not all users want, nor do all locales allow for, a human to review their recordings, etc. which leads to likely lower-quality annotations.

In some examples, a user will be able to opt-in for human review of the original source. That is users are given the option to toggle on/off consent for human review of their audio, video, etc. recordings in the annotation of those recordings. Thus, developers can only use audio to obtain higher-quality annotations for users who give explicit consent (i.e., opt-in). However, the opt-in only users can present representation bias compared to the entire population (e.g., consent for opt-in may be correlated with tenure, privacy conscientiousness, etc.) which leads to a measurement error in model performance when the model performance is measured only on opt-in users. Audio-free annotations on (a random sample of) the opt-out users introduce bias in the obtained annotations, leading to a measurement error in model performance as well.

In the opt-in scenario, it is a challenge to reliably approximate the model loss (for training) or metric (for testing) using a biased sample, as if good-quality annotations (with audio available) were obtained on the entire population of interest. In examples detailed herein, an approach called Propensity Conditional Stratified Sampling (PCSS) may be used to train/test ML models by sampling a biased sample and estimating the loss/metric.

Once the data from users is collected in a data store, PCSS is applied on the two buckets obtained from customers—those who provide consent for the use of their recordings in the annotation process and those who do not. Applying PCSS allows for the removal of bias in the training and testing of models from the biased annotated data.

At a high-level PCSS comprises a few acts. First, two scores are estimated for each data point (annotation) in the population. The first score is a propensity score that quantifies the likelihood of a data point belonging to the cohort where good-quality ground truth data can be obtained versus the rest of population where the ground truth data is subject to annotation noise and bias. Propensity scores may be used quantify the representation bias of a sample compared to (an unbiased random sample from) the whole population based on the set of observed covariates (e.g., utterance-level features such as text/session embeddings, ASR confidence, audio signals, and customer-level features).

The second score is a confidence Score that quantifies a confidence in the annotation quality (e.g., annotator's experience in years, a reliability of a surrogate signal to impute the missing vital signal for annotation, etc.). In some examples, a 100% (or near 100%) confidence is assumed for the good-quality ground truth data on the representation-biased cohort.

All of the data points are mapped onto a 2-dimensional space using these two scores. The entire population of data points is stratified along the propensity axis and sampling (e.g., random sampling) is performed from each propensity stratum separately (i.e., stratified sampling). In some examples, only data with a high confidence score (e.g., as determined by a (tunable) confidence threshold) is kept and data with a low confidence score is replaced with good-quality annotatable data with a "similar" propensity score (e.g., from the same propensity stratum). The sampled data is used to train/test an ML model.

A statistical estimator that upweights (or downweights) sampled data points where propensity is low (or high) may then be used to evaluate the ML model's performance.

PCSS is generally applicable to any ML models that rely on ground truth data for training and testing, where only a biased sample is annotated. Most existing work in the literature concerns addressing biased sample for ML model training while testing still requires an unbiased sample.

FIG. 1 illustrates examples of a system for performing training and/or testing a ML model. In this example, the ML model is trained on annotated text, but this is merely illustrative. For example, the training data may be video data, image data, etc. Additionally, many aspects are labeled "service/component." This labeling is used to show that aspects may be performed as a service of a provider network (e.g., a part of a ML training service, feeding a ML training service, feeding a ML training component, etc.), as internal service not exposed to customers, and/or as components of a software program/programs.

As shown, an audio source 102 provides audio data to an audio service/component 110. Example audio sources include, but are not limited to a speaker, a recording, an audio file, an audio/visual file, etc.

The audio service/component 110 stores the audio data in a data store 112. The data store 112 may be a part of a data storage service of a provider network 100. The audio service/component 110 also captures audio in some examples (for example, the audio service/component 110 captures a speaker's voice providing a request to a smart device such as a smartphone, smart speaker, etc.).

An audio annotation service/component 130 is used to annotate the audio of the data store 112. In some examples, text to be annotated is provided by one or more automatic speech recognition (ASR) models 132. Examples of ASR approaches include, but are not limited to Wav2Vec2, Whisper, Speech2Text, Quartznet, Cirtrinet, Conformer, Hidden Markov models (HMMs), dynamic time warping (DTW), etc. Note that the ASR model(s) 132 may be a part of the audio/service component 110 or otherwise outside of the audio annotation service/component 130.

A human annotation input service/component 134 allows for a human to annotate text (or image information, or video information, etc.). This annotation may be to text generated by an ASR model 132 or be to text generated by a person.

Figure 2:
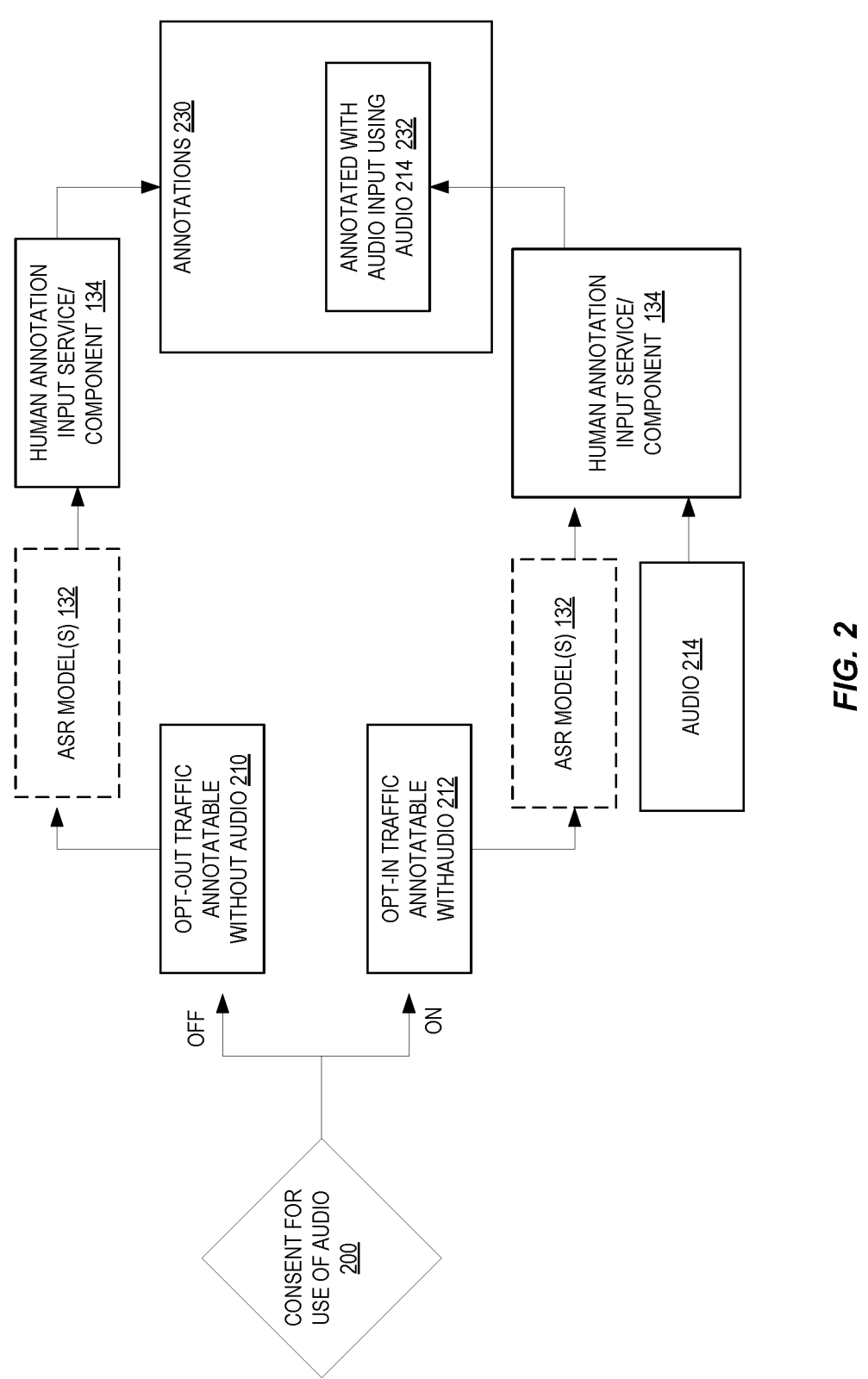
FIG. 2 illustrates examples of the generation of annotated data from audio.

FIG. 2 illustrates examples of the generation of annotated data from audio. As shown, a user provides consent (opt-in) for the use of audio or not using a consent mechanism 200 (shown as consent input 131 in FIG. 1). The consent or not may be provided orally or via a graphical user interface in some examples.

In some examples, the ASR model(s) 132 are used to generate text.

For a customer that does not opt-in (opt-out) that customer's opt-out traffic 210 is annotatable, but without human intervention using audio. Annotators will have to perform annotations relying on noisy text from ASR, which can lead to error-prone annotations (audio-free annotations) for training and evaluating ML models.

A smaller subset of annotated text is generated with human input using audio 214 242 for opt-in traffic 212. In some examples, the human annotation input service/component 134 is used to text based on the audio without any prior text generation. The use of opt-in will impact the annotated data available and introduces representation bias (opt-in) and labeling bias (opt-out).

A sampling service/component 136 performs PCSS. A propensity scorer 150 estimates propensity scores. In some examples, the propensity scorer 150 estimates propensity scores by fitting a linear logistic regression model on the entire population of annotations given the set of observed covariates as input and the simulated opt-in/opt-out status as binary class target.

A confidence scorer 152 estimates confidence scores that quantifies a confidence in the correctness of annotations where a human did not review the audio. In some examples, a confidence output from an ASR model that generated the annotation is used in the estimation of a confidence score. In some examples, a confidence score is 100% for annotation generated from audio that a human reviewed.

A score mapper 154 maps all of the data points (annotations) onto a multidimensional (e.g., a 2-dimensional) space using these scores. For example, a 2-D space having a propensity axis and a confidence axis.

A stratifier 156 stratifies or bins the entire population of mapped data points along a propensity axis.

A sampler 157 samples each bin. In some examples, the bins are randomly sampled without replacement ensuring unbiased representation from the whole population in the sampled set. Sampled opt-out samples that have lower ASR confidence than a predefined threshold may be swapped out with opt-in samples from the same propensity bin, reducing labeling bias.

In some examples, the type of PCSS sampling to perform is dictated by a request. In some examples, the number of samples per bin and/or test set size to acquire is dictated by request. In some examples, a threshold for swapping is dictated by request.

Figure 3:
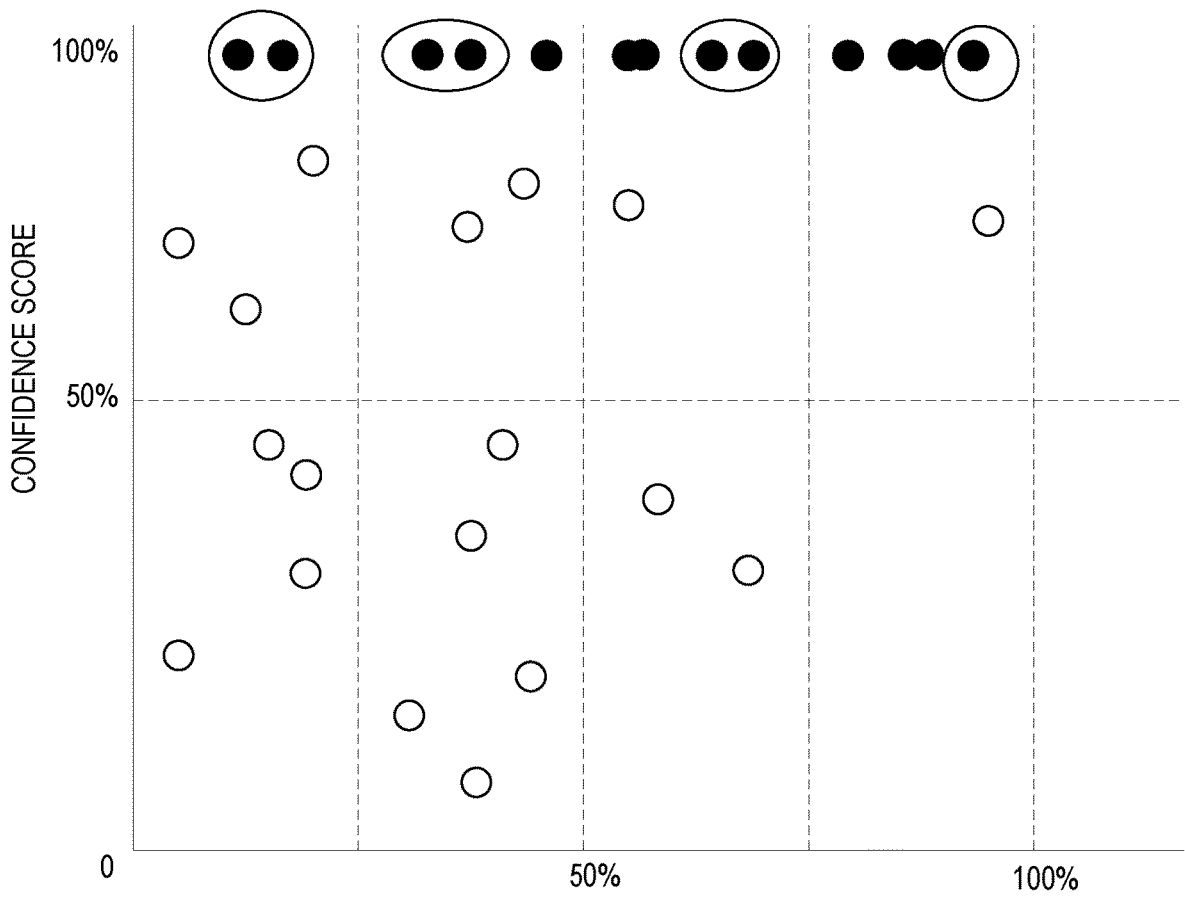
FIG. 3 illustrates using only opt-in annotations.

FIG. 3 illustrates PCSS using only opt-in annotations. In this illustration, opt-in annotations are shown as filled-in circles. Opt-out annotations are shown as circles that are not filled in. If the volume of opt-in traffic is greater than the desired test set size, the sampling can be entirely from opt-in data. Representation bias is still solved as by sampling within propensity bins. Note that the test set is those annotations that are highlighted by a circle or oval.

Figure 4:
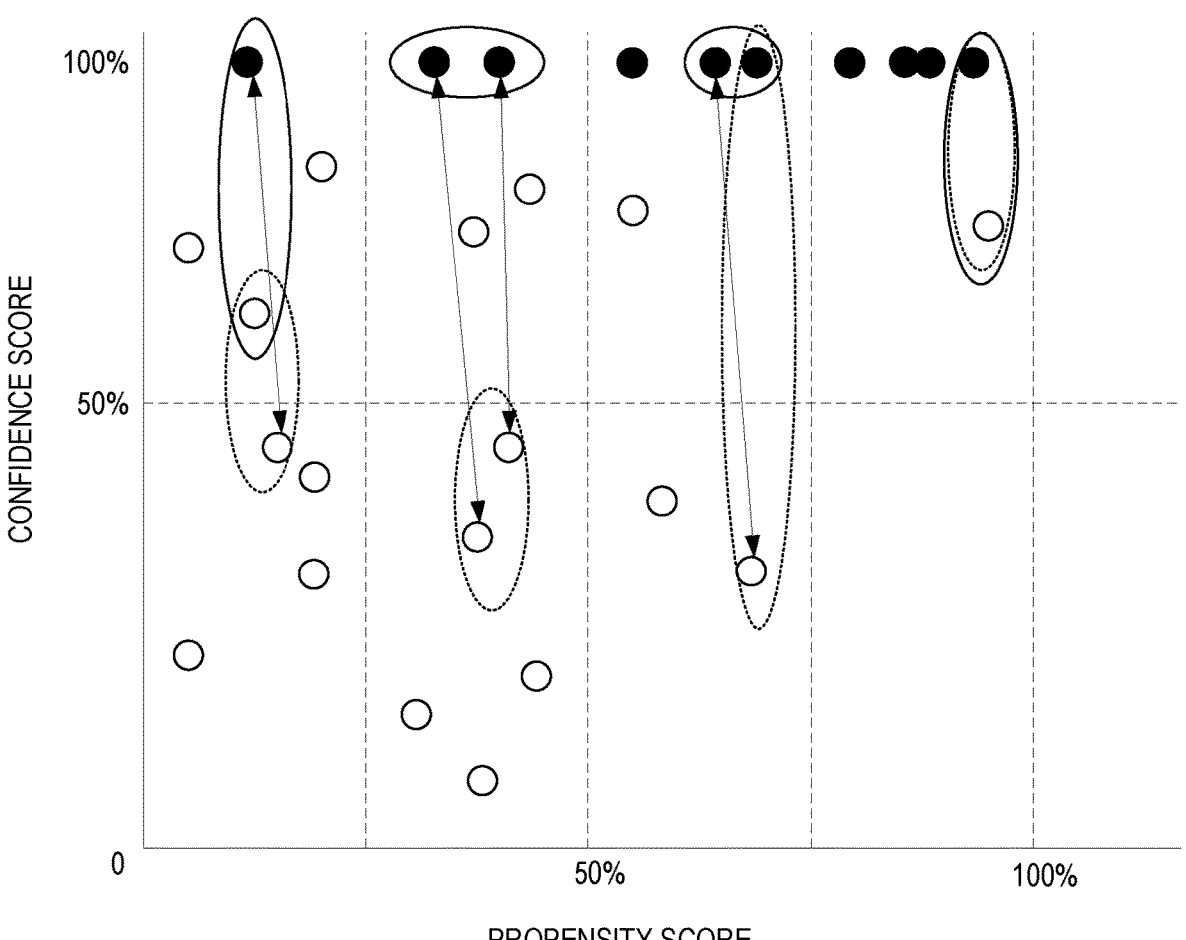
FIG. 4 illustrates using opt-in and opt-out annotations.

FIG. 4 illustrates PCSS using opt-in and opt-out annotations. In this example, two utterances are to be sampled from each propensity bin. In some examples, when the volume of opt-in traffic is less than the test set size, both opt-in and opt-out annotations are sampled. Low confidence opt-out samples are swapped with opt-in samples from the same propensity bin. The initial sampling is highlighted by a dashed circle or oval. The solid circle represents after sampling.

The sampled data test set is used to train/test a ML model.

A statistical estimator 158 is used to evaluate the trained/tested ML model. In some examples, the statistical estimator 158 upweights (or downweights) sampled data points where propensity is low (or high). In some examples, a model's performance is estimated by reweighting the samples in the test set $w_i$ if the i-th sample falls in the k-th propensity bin $$w_i = N_k/n_k$$

where $N_k$ is the total number of samples and $n_k$ is the number of samples from the k-th propensity bin.

A ML model training service/component 120 is used to train/test a model. In some examples, ML model evaluator 728 incorporates the statistical estimator 158.

A ML model hosting service/component 140 may be used to host a model.

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

FIG. 5 is a flow diagram illustrating operations of a method for annotation according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the (audio) annotation service/component 130 of the other figures. While this illustration pertains to audio, the approach detailed may be used for other data such video, images, etc.

An indication of consent to have a human annotate received audio is received at 500. For example, may provide consent orally, via a textual input, and/or using an opt-in prompt to indicate an opt-in. In some examples, a GUI is used for the textual input and/or opt-in prompt. In some examples, the consent is an opt-in (such that by default the audio is not available). In some examples, the consent is an opt-out (such that by default the audio is available).

One or more requests to generate and/or use bias samples is/are received at 502. The one or more requests may include one or more of: an indication of a location of the annotations, an indication of how many annotations to sample, an indication of a confidence score threshold to use in swapping, an indication of if opt-in and opt-out data is to be used, an indication of if only opt-in data is to be used, an indication of a ML model to train and/or evaluate, an indication of where information about audio to be used in the sampling is to be stored, an indication of where received audio is to be stored, an indication of an ASR model to use to generate text, an indication of a location of the annotations, an indication of how many annotations to sample, an indication of a confidence score threshold to use in swapping, etc. In some examples, one or more of the above are hyperparameters (e.g., the confidence score is a hyperparameter).

Audio data is received at 504. For example, audio user input into a smart speaker, etc. is received. Audio data may be recordings of existing audio. The audio data may be received by audio/service component 110.

The received audio data is stored at 506. In some examples, the audio data is stored in data store 112. Text corresponding to the sampled audio data utterances is generated at 508. For example, an ASR model is used to predict text of the audio.

The audio data is sampled at 510. For example, aspects of PCSS are performed. A propensity score for each audio data utterance is estimated at 512 (e.g., using the text data) and a confidence score for each audio data utteranceis estimated at 514. In some exmamples, the confidence score estimation may also use the text data or other data from the ASR model.

The mapped audio data utterances are stratified according to the propensity scores at 516.

Each propensity stratum is sampled to generate a sampled test set of audio data utterances at 518. In some examples, this sampling may include swapping (when PCSS is to use opt-in and opt-out data).

Annotations for the text are received at 522. These annotations may have the benefit of audio (opt-in) or just be based on the ASR text (opt-out).

In some examples, a ML model is trained and/or evaluated using the sampled test set at 524. In some examples, a statistical estimator is used to evaluate the ML model's performance using the sampled test set.

In some examples, information about input audio that may be used in a PCSS is maintained at 526. FIG. 6 illustrates examples of information about input audio that may be used in a PCSS approach. In some examples, this information is populated during the above described method (for example concurrently with a described act such as populating scores as they are estimated, etc.) In some examples, a database is used to provide information about input audio and how it is to be used. In some examples, this reflects a database entry. Note that in some examples not all of the illustrated fields are used. Entries may be maintained before, during, and after PCSS.

A first field stores an indication of if audio is allowed in the annotation process. This is a Boolean field.

A second field stores an indication an identifier of the received audio. This associates a given audio file with an identifier.

A third field stores an indication of a location storing the received audio.

One or more fields deal with annotations. In some examples, one or more of the annotation itself (shown as annotation name (e.g., a pre-determined label)), the type of annotation, the ASR text, and an identifier of an annotation performer are a part of an entry.

In some examples, the scores are also included in an entry.

In some examples, a field for a value for a propensity bin and/or a field for a value for a confidence threshold are stored.

Figure 7:
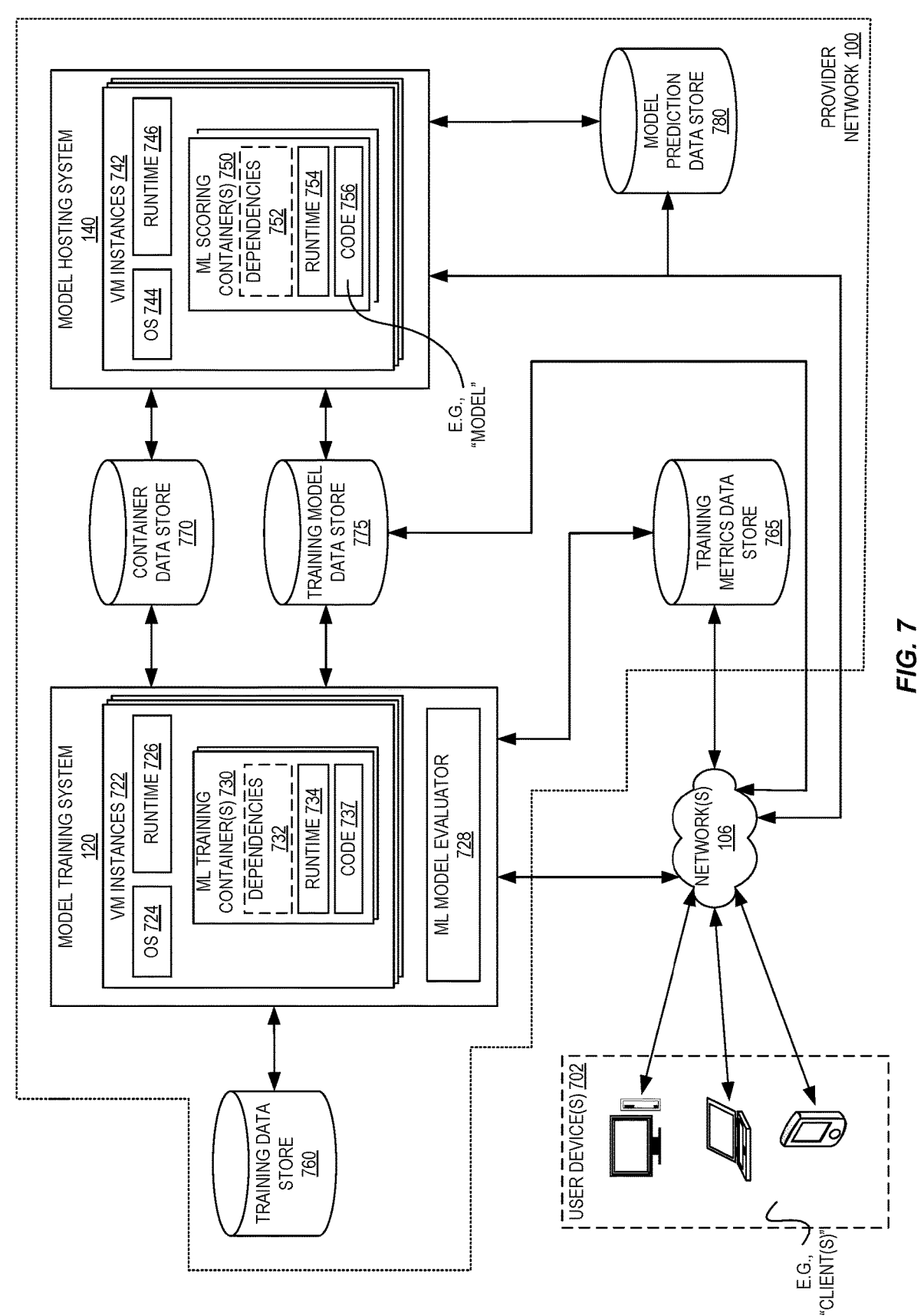
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s), edge device(s)), a model training system, a model hosting system, a training data store 760, a training metrics data store 765, a container data store 770, a training model data store 775, and a model prediction data store 780.

A machine learning service described herein may include one or more of these entities, such as the model hosting system 140, model training system 120, and so forth.

In some embodiments, users, by way of user devices 702, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 702 and the model training system 120 (or provider network 100), and/or between components of the model training system 120 (or provider network 100), can use HTTP messages to transfer data in a machine-readable file format, such as extensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 120 via frontend 729 of the model training system 120. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 120 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (for example, containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are used to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be used to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or use) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 used by the virtual machine instance 722. In some embodiments, the runtime 734 is different than the runtime 726 used by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 760. Thus, the model training system 120 retrieves the training data from the indicated location in the training data store 760. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 120 can retrieve a second portion of the 16 rainingg data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrie ved by the model training system 120 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend 749 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are used to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be used to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 used by the virtual machine instance 742. In some embodiments, runtime 754 is different than the runtime 746 used by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend 749 in some embodiments. A deployment request causes the model hosting system 140 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend 749, where the execution request identifies an endpoint and includes an input to a machine learning model (for example, a set of input data). The model hosting system 140 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 120. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 140. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (for example, execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
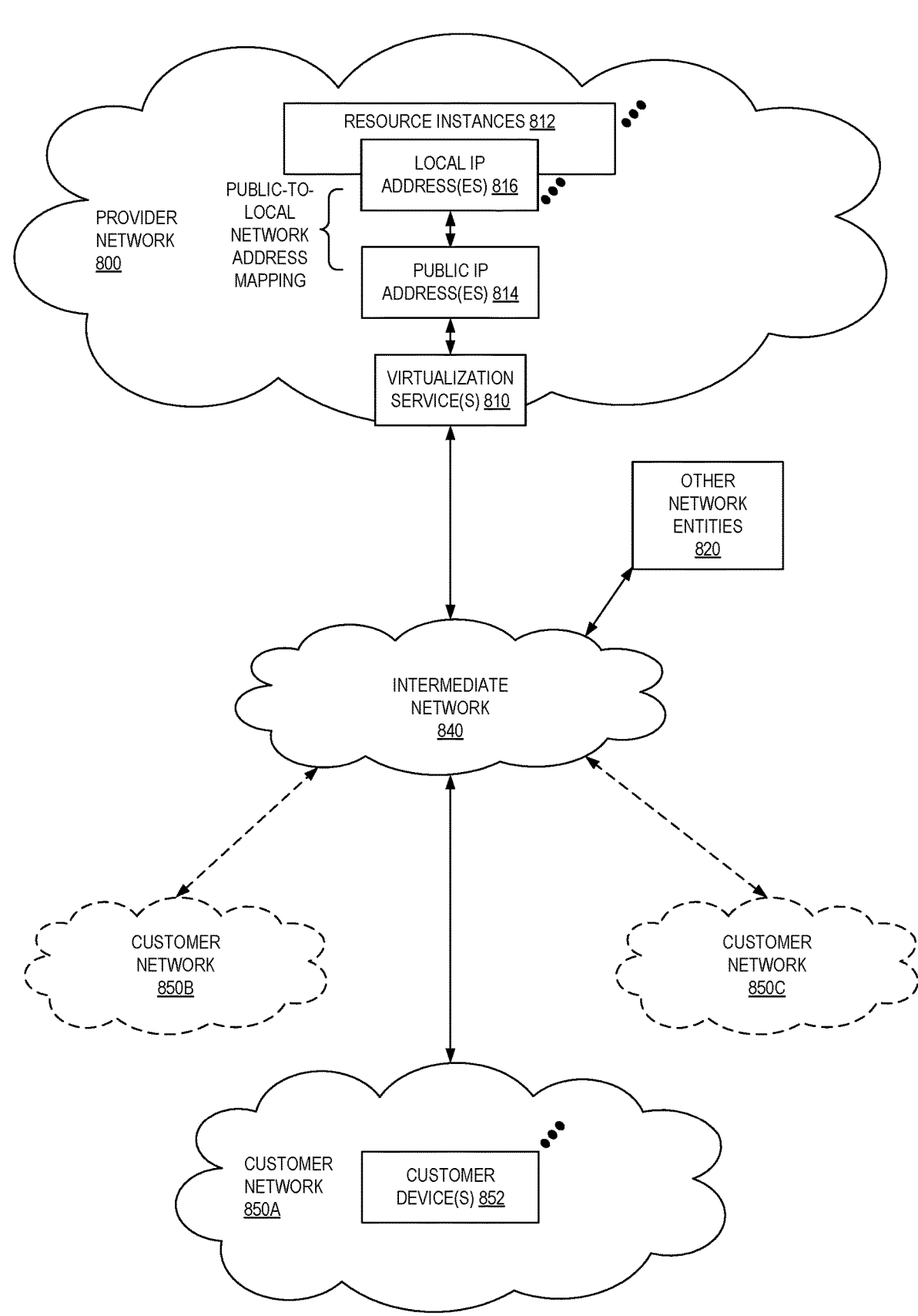
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4

(Ipv4) or Internet Protocol version 6 (Ipv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
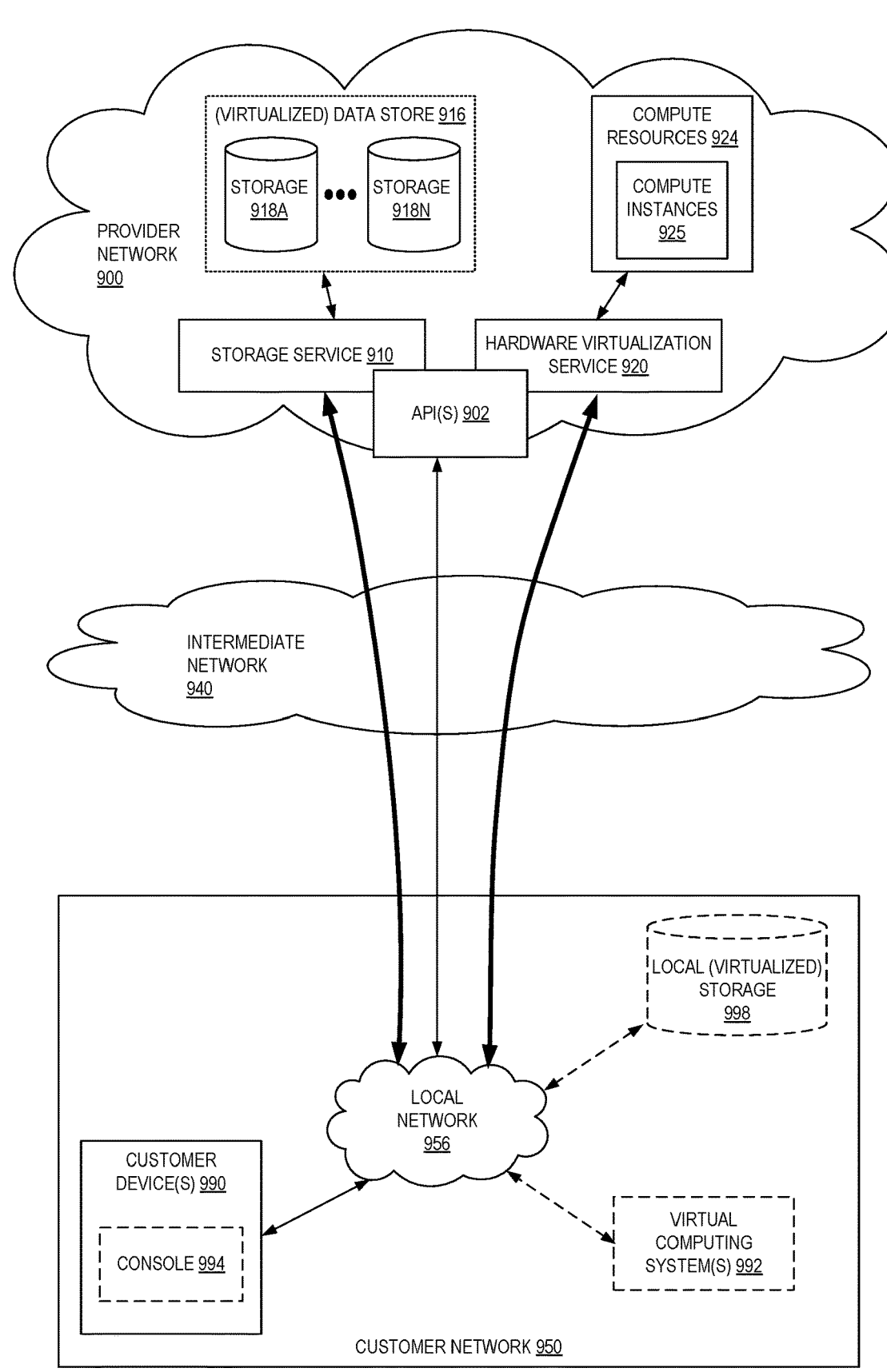
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

Figure 10:
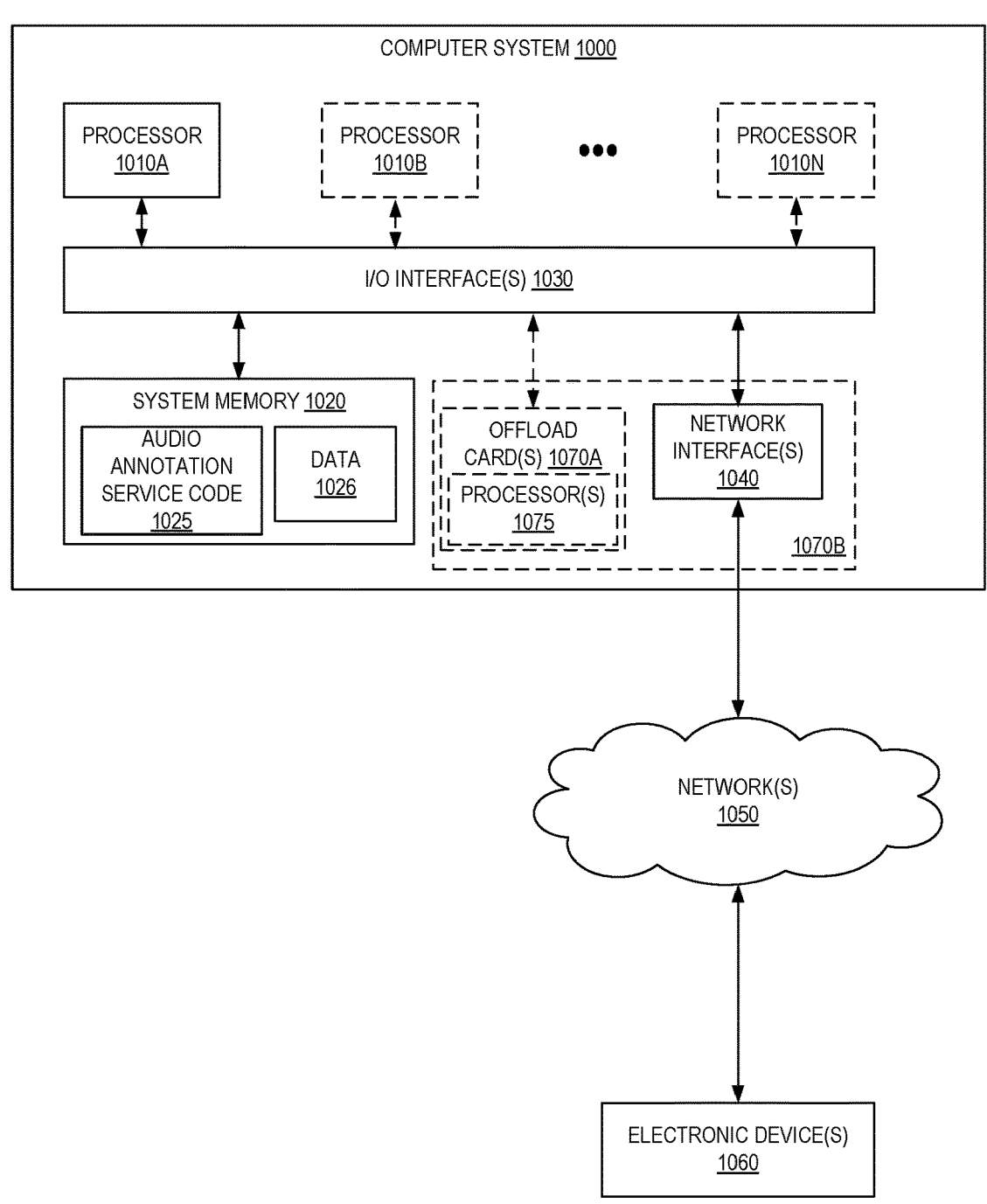
FIG. 10 is a block diagram illustrating an example computer system that can be used in some examples.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.
Illustrative Systems In some examples, a system that implements a portion or all of the techniques described herein can include a general-purpose computer system, such as the computer system 1000 (also referred to as a computing device or electronic device) illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as audio annotation service code 1025 (e.g., executable to implement, in whole or in part, the audio annotation service 130) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UpnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from OracleI, MicrosI®, IasI), IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving audio data to be annotated;
   receiving text derived from the audio data;
   receiving annotations associated with the text derived from the audio data, wherein at least a proper subset of the annotations is human-generated using the data according to an opt-in preference;
   generating a sampled test set by:
       estimating, by an audio annotation service implemented as audio annotation service code executed out of memory by one or more processors, a propensity score for each annotation, wherein the propensity score quantifies a likelihood of each annotation being human-generated using the audio data;
       estimating a confidence score for each annotation, wherein the confidence score quantifies a confidence in a correctness of the annotation;
       mapping each annotation to a multi-dimensional space based at least in part on the propensity score to generate mapped annotations;
       binning the mapped annotations; and
       sampling each bin of the mapped annotations according to a request to generate the sampled test set; and
   training a machine learning (ML) model using the sampled test set.

2. The computer-implemented method of claim 1, wherein the request to generate a sampled test set indicates the sampling is to only use the proper subset of the annotations that are human-generated using the data according to an opt-in preference.

3. The computer-implemented method of claim 1, wherein the request to generate a sampled test set indicates the sampling is to use the proper subset of the annotations that are human-generated using the data and a proper subset of the annotations that are human-generated without using the data.

4. A computer-implemented method comprising:
   receiving data to be annotated;
   receiving annotations associated with the data, wherein at least a proper subset of the annotations is human-generated using the data according to an opt-in preference;
   sampling the annotations to generate a sampled test set by:
       estimating, by an audio annotation service implemented as audio annotation service code executed out of memory by one or more processors, a propensity score for each annotation, wherein the propensity score quantifies a likelihood of each annotation being human-generated using the data,
       estimating a confidence score for each annotation, wherein the confidence score quantifies a confidence in a correctness of the annotation,
       mapping each annotation to a multi-dimensional space based at least in part on the propensity score to generate mapped annotations,
       stratifying, based on the propensity score, the mapped annotations into strata, and sampling each stratum of the mapped annotations according to a request to generate the sampled test set; and performing at least one of evaluating a machine learning (ML) model using the sampled test set or training another ML model using the sampled test set.

5. The computer-implemented method of claim 4, wherein the training is performed using a service of a provider network.

6. The computer-implemented method of claim 5, wherein the request to generate a sampled test set indicates the sampling is to only use the proper subset of the annotations that are human-generated using the data according to an opt-in preference.

7. The computer-implemented method of claim 5, wherein the request to generate a sampled test set indicates the sampling is to use the proper subset of the annotations that are human-generated using the data and a proper subset of the annotations that are human-generated without using the data.

8. The computer-implemented method of claim 7, wherein low confidence score annotations from the proper subset of the annotations that are human-generated without using the data are swapped with annotations that are human-generated using the data of a same stratum.

9. The computer-implemented method of claim 8, wherein the low confidence score annotations are below a confidence score threshold.

10. The computer-implemented method of claim 9, wherein the confidence score threshold is configurable.

11. The computer-implemented method of claim 5, wherein evaluating a ML model uses a statistical estimator.

12. The computer-implemented method of claim 11, wherein the statistical estimator is to re-weight samples in the sampled test set based at least in part on the propensity scores.

13. The computer-implemented method of claim 4, wherein the data to be annotated is audio data.

14. The computer-implemented method of claim 13, wherein text is generated from the audio data using at least one automatic speech recognition machine learning model.

15. A system comprising:

a first one or more electronic devices to implement a data storage service in a multi-tenant provider network; and a second one or more electronic devices to implement an annotation service in the multi-tenant provider network, the annotation service including instructions that upon execution cause the annotation service to:

receive data to be annotated from the data storage service;

receive annotations associated with the data, wherein at least a proper subset of the annotations is human-generated using the data according to an opt-in preference;

sample the annotations to generate a sampled test set by estimating, by an audio annotation service implemented as audio annotation service code executed out of memory by one or more processors, a propensity score for each annotation, wherein the propensity score quantifies a likelihood of each annotation being human-generated using the data, estimating a confidence score for each annotation, wherein the confidence score quantifies a confidence in a correctness of the annotation, mapping each annotation to a multi-dimensional space based at least in part on the propensity score to generate mapped annotations, stratifying, based on the propensity score, the mapped annotations into strata, and sampling each stratum of the mapped annotations according to a request to generate the sampled test set; and perform at least one of evaluating a machine learning (ML) model using the sampled test set or training another ML model using the sampled test set.

16. The system of claim 15, further comprising a model training service to train the ML model using the sampled test set.

17. The system of claim 15, further comprising a model hosting service to host a ML model trained using the sampled test set.

18. The system of claim 15, wherein the request to generate a sampled test set indicates the sampling is to only use the proper subset of the annotations that are human-generated using the data according to an opt-in preference.

19. The system of claim 15, wherein the data to be annotated is audio data.

20. The system of claim 15, wherein text is generated from the audio data using at least one automatic speech recognition machine learning model.

*   *   *   *   *